United States Patent
Dalton et al.

(10) Patent No.: US 10,461,926 B2
(45) Date of Patent: Oct. 29, 2019

(54) CRYPTOGRAPHIC EVIDENCE OF PERSISTED CAPABILITIES

(71) Applicant: HEWLETT PACKARD ENTERPRISE DEVELOPMENT LP, Houston, TX (US)

(72) Inventors: Chris I. Dalton, Bristol (GB); Dejan S. Milojicic, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 91 days.

(21) Appl. No.: 15/252,392

(22) Filed: Aug. 31, 2016

(65) Prior Publication Data
US 2018/0063158 A1   Mar. 1, 2018

(51) Int. Cl.
*H04L 9/08* (2006.01)
*H04L 9/32* (2006.01)
*G06F 21/57* (2013.01)

(52) U.S. Cl.
CPC .......... *H04L 9/083* (2013.01); *G06F 21/575* (2013.01); *H04L 9/0891* (2013.01); *H04L 9/0894* (2013.01); *H04L 9/3242* (2013.01)

(58) Field of Classification Search
CPC ...................................................... H04L 9/083
USPC ......................................................... 713/176
See application file for complete search history.

(56) References Cited

U.S. PATENT DOCUMENTS

| 5,845,331 | A | 12/1998 | Carter et al. | |
|---|---|---|---|---|
| 8,132,003 | B2* | 3/2012 | Durham | G06F 21/54 380/255 |
| 2002/0001395 | A1* | 1/2002 | Davis | G06F 21/10 382/100 |
| 2003/0221109 | A1* | 11/2003 | Boyer | H04L 9/3242 713/176 |
| 2006/0265508 | A1* | 11/2006 | Angel | H04L 29/12047 709/230 |
| 2009/0199009 | A1* | 8/2009 | Chia | H04L 63/0281 713/176 |
| 2013/0125228 | A1* | 5/2013 | Do | G06F 21/33 726/9 |
| 2013/0139225 | A1* | 5/2013 | Saito | G06F 21/608 726/4 |
| 2015/0033305 | A1* | 1/2015 | Shear | G06F 21/45 726/11 |

(Continued)

OTHER PUBLICATIONS

"KeyKOS—A Secure, High-Performance Environment for S/370," Mar. 1988, pp. 1-14, Key Logic, Inc., Available at: <cis.upenn.edu/~KeyKOS/Key370/Key370.html>.

(Continued)

*Primary Examiner* — Khalil Naghdali
(74) *Attorney, Agent, or Firm* — Hewlett Packard Enterprise Patent Department (57) ABSTRACT

Example implementations relate to cryptographic evidence of persisted capabilities. In an example implementation, in response to a request to access a persisted capability stored in a globally shared memory, a system may decide whether to trust the persisted capability by verification of cryptographic evidence accompanying the persisted capability. The system may load the persisted capability upon a decision to trust the persisted capability based on successful verification.

18 Claims, 6 Drawing Sheets

(56) References Cited

U.S. PATENT DOCUMENTS

2015/0082399 A1* 3/2015 Wu .................. G06F 21/6209
726/6

OTHER PUBLICATIONS

Akhilesh Singhania et al., "Capability Management in Barrelfish," Barrelfish Technical Note 013, Dec. 1, 2013, pp. 1-43, Available at: <barrelfish.org/TN-013-CapabilityManagement.pdf>.

Bill Frantz et al., "GNOSIS: A Prototype Operating System for the 1990's," 1995, pp. 1-25, Available at: <cis.upenn.edu/~KeyKOS/Gnosis/Gnosis.html>.

Gabriel Parmer, "Composite Component-Based OS," 2013, pp. 1-5, Available at: <composite.seas.gwu.edu/>.

George Coulouris et al., "Chapter CDK3—18: Mach Case Study," 2001, pp. 1-18, Archive Material from Edition 3 of Distributed Systems:Concepts and Design, Pearson Education.

George Coulouris et al., "Chorus," 1994, pp. 1-11, Archive material from Edition 2 of Distributed Systems: Concepts and Design, Distributed Systems.

Henry M. Levy. "The IBM System/38," Capability-Based Computer Systems,: Chapter 8, 1984, pp. 137-158 , Digital Press.

Robert N.M. Watson, "Capability Hardware Enhanced RISC Instructions (CHERI)," May 18, 2016, pp. 1-3, Available at: <cl.cam.ac.uk/research/security/ctsrd/cheri/>.

Wikipedia, "Barrelfish," May 18, 2016, pp. 1-2, Available at: <en.wikipedia.org/wiki/Barrelfish>.

Wikipedia, "EROS (microkernel)," May 18, 2016, pp. 1-4, Available at: <en.wikipedia.org/wiki/EROS_(microkernel)>.

Wikipedia, "L4 microkernel family," May 18, 2016, pp. 1-8, Available at: <en.wikipedia.org/wiki/L4_microkernel_family>.

WiKIPEDIA, "Capability-Based Security," Aug. 19, 2016, pp. 1-6 (online), Retrieved from the Internet on Apr. 16, 2018 at URL: <en.wikipedia.org/w/index.php?title=Capability-based_security &oldid=735164352>.

* cited by examiner

CRYPTOGRAPHIC EVIDENCE OF PERSISTED CAPABILITIES

BACKGROUND

A computing system and an operating system thereof may employ capabilities to represent, address, and grant access to system objects or resources, such as memory. In some instances, such capabilities may be unforgeable by virtue of architectural support within the computing system.

BRIEF DESCRIPTION OF THE DRAWINGS

Various examples will be described below with reference to the following figures.

Throughout the drawings, identical reference numbers may designate similar, but not necessarily identical, elements. A hyphenated index number "N" appended to some of the reference numerals may be understood to merely denote plurality and may not necessarily represent the same quantity for each reference numeral having such an index number "N". Additionally, use herein of a reference numeral without a hyphenated index number, where such reference numeral is referred to elsewhere with a hyphenated index number, may be a general reference to the corresponding plural elements, collectively or individually.

DETAILED DESCRIPTION

Capabilities are tokens of authority that grant programs and processes access to resources of a system, such as memory or services. For example, the data content of a "fat-pointer" type of capability may include a base address and length that refers or points to a portion of memory. A capability may also include metadata that specifies other parameters of the access, such as permissions.

Within a closed system, such as a node coupled to private node-local memory, unforgeability of capabilities may be accomplished by virtue of processor architecture, memory architecture, instruction set architecture (ISA), or a combination thereof. For example, capabilities may be loaded into capability registers, and may be dereferenced, manipulated, or otherwise accessed solely through privileged instructions of the ISA. In this manner, the closed system is a trust domain within which capabilities can be trusted.

In some implementations, capabilities may be stored into a globally shared, non-volatile memory. For example, a rack-scale system may include compute nodes that access a globally shared memory via a memory fabric. Storing a persisted capability to globally shared memory may be useful for persisting a capability across node system reboots and also may be useful if the capability provides access to a region of the globally shared memory.

However, capabilities stored and persisted in globally shared memory may be at rest and not under the active control of a kernel, and moreover, may be subject to tampering or forging. Thus, it may be useful to establish a trust domain for capabilities that are stored and persisted in globally shared memory.

Examples disclosed herein may relate to, among other things, a system that, in response to a request to access a persisted capability stored in a globally shared memory, may decide whether to trust the persisted capability by verification of cryptographic evidence accompanying the persisted capability. Upon a decision to trust the persisted capability based on successful verification, the system may load the persisted capability. By virtue of the foregoing, the system may verify the integrity and authenticity of a persisted capability before loading the persisted capability from globally shared memory.

Figure 1:
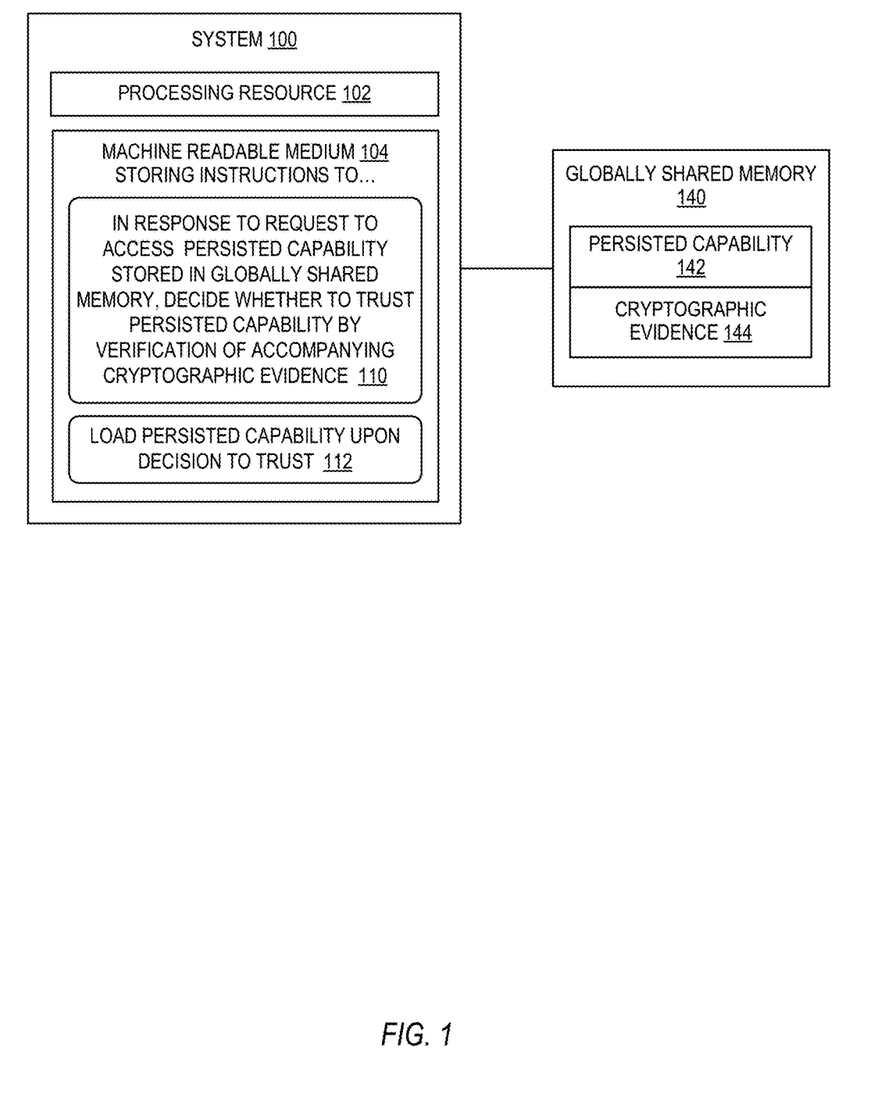
FIG. 1 is a block diagram depicting an example system that decides whether to trust a persisted capability.

Referring now to the figures, FIG. 1 is a block diagram depicting an example system 100 that decides whether to trust a persisted capability. The system 100 includes a processing resource 102 and a non-transitory machine readable medium 104 storing (or encoded with) instructions 110, 112 that, when executed by the processing resource 102, cause the processing resource 102 to perform the functionality described below.

The processing resource 102 may be a microcontroller, a microprocessor, central processing unit (CPU) core, an application-specific integrated circuit (ASIC), a field programmable gate array (FPGA), and/or the like, suitable for retrieving and executing instructions 110, 112 from the medium 104. The non-transitory machine readable medium 104 may be random access memory (RAM), read-only memory (ROM), electrically erasable programmable read-only memory (EEPROM), flash memory, a hard disk drive, etc. The term "non-transitory" does not encompass transitory propagating signals.

The system 100 may also be in communication with a globally shared memory 140 via, for example, a wireless and/or wired network communication path, such as a memory fabric. The global shared memory 140 may include persistent memory formed from non-volatile memory or storage devices (e.g., flash memory devices, phase-change memory devices, spin-transfer torque memory devices, resistive random-access memory or memristive devices, hard disk drives, solid state drives, etc.).

Persisted capabilities (e.g., 142) may be stored on the globally shared memory 140. For example, persisted capabilities may be stored on the globally shared memory 140 by virtue of being pre-loaded, e.g., as a factory default, loaded by an administrator, or loaded from an out-of-band source. In other examples, persisted capabilities may be stored on the globally shared memory 140 by the system 100 or another system in communication with the globally shared memory 140, in an example manner as will be described further herein below (with respect to FIG. 2).

In some implementations, the system 100 may be or form part of a compute node in a rack-scale system. Moreover, in some implementations, the system 100 may run an operating system kernel that architecturally supports the use of capabilities.

The processing resource 102, or particularly a kernel executing on the processing resource 102, may receive a request to access a persisted capability (142) stored in the globally shared memory 140. For example, the request may be issued by a process executing on the processing resource 102, as the process seeks to invoke the persisted capability. As used herein, a process executing on a processing resource may also be understood to refer to applications or tasks that execute on a processing resource.

In response to such a request, the processing resource 102 may execute instructions 110 to decide whether to trust the persisted capability 142 by verification of cryptographic evidence 144 accompanying the persisted capability 142. The processing resource 102 may execute instructions 112 to load the persisted capability upon a decision to trust the persisted capability 142 based on successful verification of the cryptographic evidence 144. By virtue of the foregoing, the system 100 may prove the integrity of persisted capabilities prior to accessing and invoking the persisted capabilities.

Figure 2:
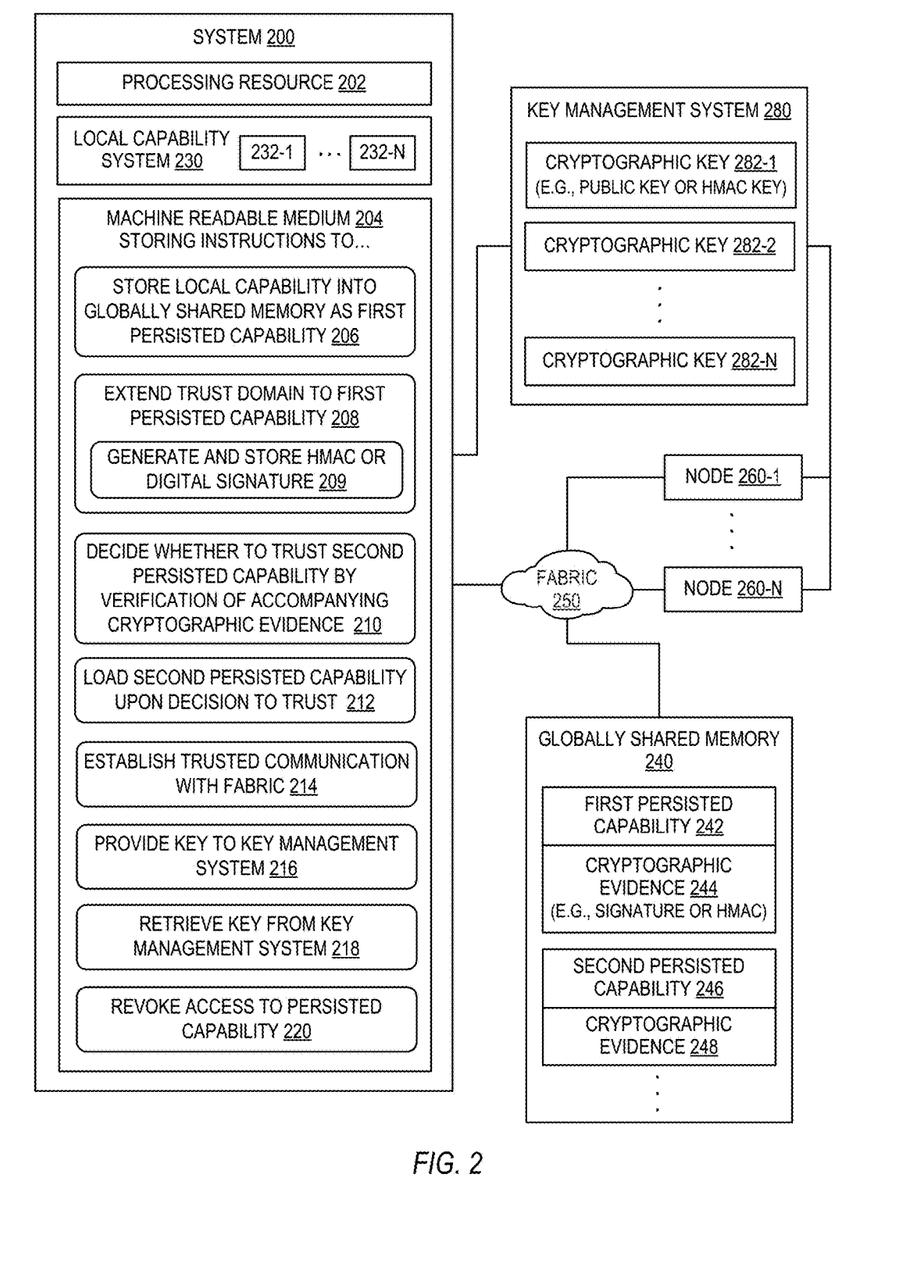
FIG. 2 is a block diagram depicting another example system that decides whether to trust a persisted capability.

FIG. 2 is a block diagram depicting an example system 200 that decides whether to trust a persisted capability, according to another implementation. The system 200 includes a processing resource 202 and a non-transitory machine readable medium 204, which may be analogous in many respects to the processing resource 102 and the medium 104, respectively. The medium 204 may store (or be encoded with) instructions 206-220 executable by the processing resource 202 to perform the functionality described below.

In some implementations, the system 200 may be or form part of a compute node in a rack-scale system. In some implementations, the system 200 may run an operating system kernel that architecturally supports the use of capabilities. For example, the system 200 may include a local capability system 230 that provides architecture such as capability registers, capability-specific instruction set architecture, etc., to support individual local capabilities 232-1 through 232-N (also referred to collectively as local capabilities 232 or individually and generally as a local capability 232). Local capabilities 232-1 through 232-N may provide, to processes executing on the system 200, access to private or local memory of the system 200. In other words, processes may be associated with or may be assigned one or more local capabilities 232.

The system 200 may be in communication with a globally shared memory 240 via a fabric 250. Similar to the globally shared memory 140, the globally shared memory 240 may include persistent memory formed from non-volatile memory or storage devices. In some implementations, the fabric 250 may be a memory fabric by which additional systems, such as nodes 260-1 through 260-N (also referred to collectively as nodes 260 or individually and generally as a node 260), may access the globally shared memory 240. Some of the nodes 260 may feature functionality similar to that of the system 200 described herein. For example, the nodes 260-1 through 260-N and the system 200 may be compute nodes in a rack-scale system.

In some implementations, the system 200 and the nodes 260 also may be in communication with a key management system 280, via the fabric 250 or another wired or wireless network. As will be described below, the system 200 and nodes 260 may use cryptographic techniques, such as asymmetric public-private key encryption or symmetric keyed-hash message authentication code (HMAC) generation, to create cryptographic evidences of associated persisted capabilities stored at the globally shared memory 240. The key management system 280 can store cryptographic keys (e.g., 282-1 through 282-N) for verifying such cryptographic evidences. More particularly, a stored cryptographic key may be a public key if an asymmetric encryption technique was utilized to generate to generate the cryptographic evidence, or a stored cryptographic key may be an HMAC symmetric key if an HMAC technique was utilized to generate the cryptographic evidence. In some implementations, the key management system 280 may restrict access to the cryptographic key stored thereon unless a node is trusted. In some implementations, the key management system 280 may generate key(s) that is/are made available to each node or system that establishes trust and joins the fabric. In some implementations, the key management system 280 may be analogous to a certificate authority.

Instructions 214, 216, 218, when executed by the processing resource 202, may be useful for the system 200 to interact with the key management system 280. Instructions 214, when executed, may cause the processing resource 202 to establish trusted communication with the fabric 250, which includes the globally shared memory 240. For example, trust may be established via a secure boot mechanism (e.g., booting using a Trusted Platform Module or a UEFI secure boot database) or an admission control process involving the fabric 250 and the communication protocol thereof.

Once trusted communication has been established by the instructions 214, the key management system 280 may permit access to the system 200. Instructions 216 may cause the processing resource 202 to provide a cryptographic key to the key management system, such as a public key of an asymmetric key pair or a key for calculation of HMACs. The key provided by execution of instructions 216 may be useful for verifying at least some cryptographic evidences created by the system 200 and stored to the globally shared memory 240. To illustrate, consider that cryptographic key 282-1 shown in FIG. 2 is provided by the system 200. The system 200 also may locally maintain a copy of its asymmetric public and private key pair or its HMAC key, as the case may be.

Also after establishing trusted communication, instructions 218 may cause the processing resource 202 to retrieve another cryptographic key from the key management system 280. To illustrate, consider that the retrieved another cryptographic key is the cryptographic key 282-2 shown in FIG. 2. The another cryptographic key retrieved by the system 200 may be provided to the key management system 280 by another node (e.g., 260) in communication with the globally shared memory 240 or generated by the key management system 280. The another cryptographic key may be used by the system 200 to verify cryptographic evidence accompanying a persisted capability stored to the globally shared memory by that another node 260. The another cryptographic key may be an asymmetric public key or a key for HMAC generation.

Instructions 206 and 208, when executed by the processing resource 202, may be useful for creating a persistent capability in a trust-enabling manner. For example, instructions 206, 208 may be invoked by a process or task executing on the processing resource 202 to persist an associated local capability 232, so that the local capability 232 can persist beyond a reboot of the system 200, so that the local capability 232 can be shared with other systems (e.g., a node 260), or for other reasons.

Instructions 206, when executed, may cause the processing resource 202 to store a local capability (e.g., 232) into the globally shared memory 240 as a first persisted capability 242. For example, instructions 206 may copy the local capability 232 into the globally shared memory 240 over the fabric 250.

Instructions 208, when executed, may cause the processing resource 202 to extend a trust domain of the local capability 232 to the first persisted capability 242 via cryptographic evidence of authenticity and integrity of the first persisted capability 242. For example, cryptographic evidence 244 may be stored in the globally shared memory 240 and may accompany the first persisted capability 242 for the purpose of later verifying the integrity of the first persisted capability 242, as will be described below. The cryptographic evidence may be generated by a symmetric or asymmetric cryptographic technique. For example, instructions 208 may further include instructions 209 to generate, as the cryptographic evidence 244, either a digital signature by an asymmetric technique or an HMAC by a symmetric technique.

For example, in some implementations, instructions 209 may cause the processing resource 202 to cryptographically sign the local capability 232 using a private key of an asymmetric key pair (e.g., via RSA encryption) to generate a digital signature, and to store the digital signature into the globally shared memory 240. In turn, the digital signature may serve as the cryptographic evidence 244 of authenticity and integrity of the first persisted capability 242. As described earlier, the public key of the asymmetric key pair may be stored to the key management system 280, as key 282-1 for example.

As another example, in some implementations, instructions 209 may cause the processing resource 202 to generate an HMAC based on the local capability 232, and store the HMAC into the globally shared memory 240. In short, example HMAC generation may include combining (concatenating) a cryptographic key with a message based on the local capability 232 and hashing the combination to generate the HMAC. The HMAC may serve as the cryptographic evidence 244 of authenticity and integrity of the first persisted capability 242. As described above, the cryptographic key may be stored to the key management system 280, as key 282-1 for example.

In some implementations, the cryptographic evidence 244 may be generated from the local capability 232 itself by first serializing the capability 232, which may initially be in bitmap form, and then applying a cryptographic technique (either private key signing or HMAC generation). The cryptographic evidence 244 also may be generated based on metadata of the local capability 232 (or of the persisted capability 242, e.g., upon creation). The metadata may include state information of the system or node that created the persisted capability (e.g., the system 100), such as versioning information (e.g., system firmware version, operating system boot loader version, kernel or micro-kernel version) or ownership information.

Instructions 210 and 212, when executed by the processing resource 202, may be useful for accessing a persistent capability. For example, a process executing on the processing resource 202 may request access to a persisted capability that is associated with that process and stored in the globally shared memory 240.

The persisted capability sought to be accessed may have been created in the globally shared memory 240 by the system 200 itself. To illustrate, the system 200 may have performed instructions 206, 208 to create the first persisted capability 246 and the system 200 may perform instructions 210, 212 to access that same first persisted capability 246. For example, the process may be requesting access of the persisted capability after a reboot of the system 200. In other examples, the system 200 may be seeking to access a second persisted capability 248, which may be created in the globally shared memory 240 by a system other than the system 200, such as a node 260, or may be pre-loaded or pre-defined in the globally shared memory 240 (e.g., as a factory default, from an out-of-band source, created by another component of a computing environment, etc.).

In response to the request, the processing resource 202 may execute instructions 210 to decide whether to trust the persisted capability (e.g., 242 or 246) by verification of cryptographic evidence (e.g., 244 or 248, respectively) accompanying the persisted capability (e.g., 242 or 246). Upon deciding to trust the persisted capability owing at least in part to a successful verification under instructions 210, the processing resource 202 may execute instructions 212 to load the persisted capability (e.g., 242 or 246), which may include loading the persisted capability (e.g., 242 or 246) from the globally shared memory 240 into the local capability system 230.

The implementation of instructions 210 may depend on a type of the cryptographic evidence (e.g., 244 or 248). For example, if the cryptographic evidence is a digital signature generated by a private key of an asymmetric key pair, instructions 210 may include decrypting the cryptographic evidence (e.g., 244 or 248) using a public key from the same asymmetric key pair, and comparing the result to an unencrypted version of the message encrypted to generate the cryptographic evidence (e.g., 244 or 248), namely the persisted capability (e.g., 242 or 246, respectively). If the result of decrypting the cryptographic evidence (e.g., 244 or 248) matches the persisted capability (e.g., 242 or 246, respectively), instructions 210 may decide to trust the persisted capability based on that match.

As another example of instructions 210, if the cryptographic evidence (e.g., 244 or 248) is an HMAC, instructions 210 may include generating another HMAC using a key and the persistent capability to be accessed (e.g., 242 or 246), and then comparing the resulting HMAC with the cryptographic evidence HMAC. If the two HMACs match, instructions 210 may decide to trust the persisted capability based on that match. Generally, in order for the two HMACs to match, the key used by instructions 210 should be the same as the key used to generate the cryptographic evidence HMAC in the first instance.

If the system 200 is accessing a persisted capability that the system 200 itself stored in the globally shared memory 240 (e.g., the first persisted capability 242 stored by instructions 206 as described above), the system 200 may utilize a locally maintained public key or HMAC key to verify the cryptographic evidence (244). If the system 200 is accessing a persisted capability stored in the globally shared memory 240 by a source other than the system 200 (e.g., stored by a node 260, pre-loaded, etc.), the system 200 may utilize a public key or HMAC key retrieved from the key management system 280 via instructions 218 (e.g., retrieved key 282-2), as described above.

In other implementations, instructions 210 may include other conditions to fulfill before trusting the persisted capability, in addition to verifying the cryptographic evidence. For example, some cryptographic evidence may be based at least in part on metadata, as described above with respect to instructions 209. In such instances, instructions 210 can additionally decide whether to trust the attestation of state information included in the cryptographic evidence, based on secure enclave key management, a Trusted Platform Module, attribute-based encryption, etc., related to the originating system of the persisted capability. Instructions 210 also may verify that a persisted capability has not expired, based on a timestamp associated with the cryptographic evidence (e.g., as plaintext or metadata, or encrypted as part of the cryptographic evidence).

The medium 204 also may include instructions 220 that, when executed, cause the processing resource 202 to revoke access to the first persisted capability 242 stored by instructions 206, by replacement of the key that verifies the first persisted capability 242 (e.g., public key or HMAC key) with a different key or no key. For example, the instructions 220 may replace or delete such verification key (e.g., cryptographic key 282-1) from the key management system 280, thus leaving no corresponding key that can correctly verify the first persisted capability 242 and thereby revoking access to the first persisted capability 242.

Figure 3:
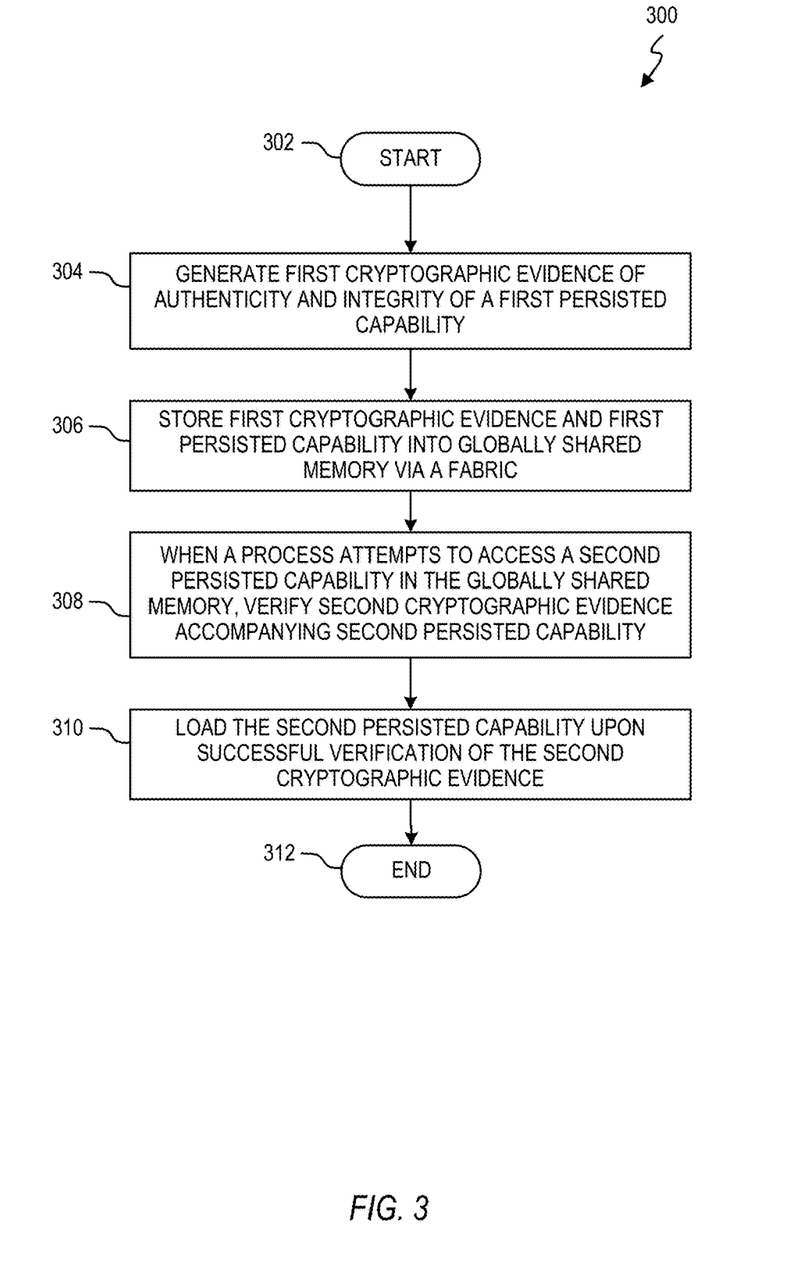
FIG. 3 is a flow diagram depicting an example method for establishing trust in persisted capabilities.

FIG. 3 is a flow diagram depicting an example method 300 for establishing trust in persisted capabilities. Method 300 may be implemented in the form of executable instructions stored on a machine readable medium and executed by a processing resource (e.g., a microcontroller, a microprocessor, central processing unit core(s), an ASIC, an FPGA, etc.) and/or in the form of electronic circuitry. For example, method 300 may be described below for illustrative purposes as being performed by a system with physical processing resources, such as the system 200, although at least portions of the method 300 may also be performed by other devices, such as the system 100. In some implementations, one or more blocks of method 300 may be executed substantially concurrently or in a different order than shown in FIG. 3. In some implementations, method 300 may include more or fewer blocks than are shown in FIG. 3. In some implementations, one or more of the blocks of method 300 may, at certain times, be ongoing and/or may repeat.

Method 300 may begin at block 302 and continue to block 304, where the system generates first cryptographic evidence of authenticity and integrity of a first persisted capability. In some implementations, the first persisted capability may be based on a capability local to the system. At block 306, the system stores the first cryptographic evidence (generated at block 304) and the first persisted capability into globally shared memory connected to the system via a fabric.

At block 308, when a process executing on the system attempts to access a second persisted capability in the globally shared memory, the system verifies a second cryptographic evidence accompanying the second persisted capability. For example, the second cryptographic evidence may also be stored on the globally shared memory. At block 310, the system loads the second persisted capability upon (in response to) successful verification of the second cryptographic evidence at block 308. At block 312, the method 300 may end.

In some cases, the second persisted capability may have been stored to the globally shared memory by a node different from the system but also connected to the fabric. In other cases, the second persisted capability may have been pre-loaded into the globally shared memory. In yet other cases, the second persisted capability may have been previously stored by the system itself, and verification of the second cryptographic evidence is enforced after a reboot of the system.

Figure 4:
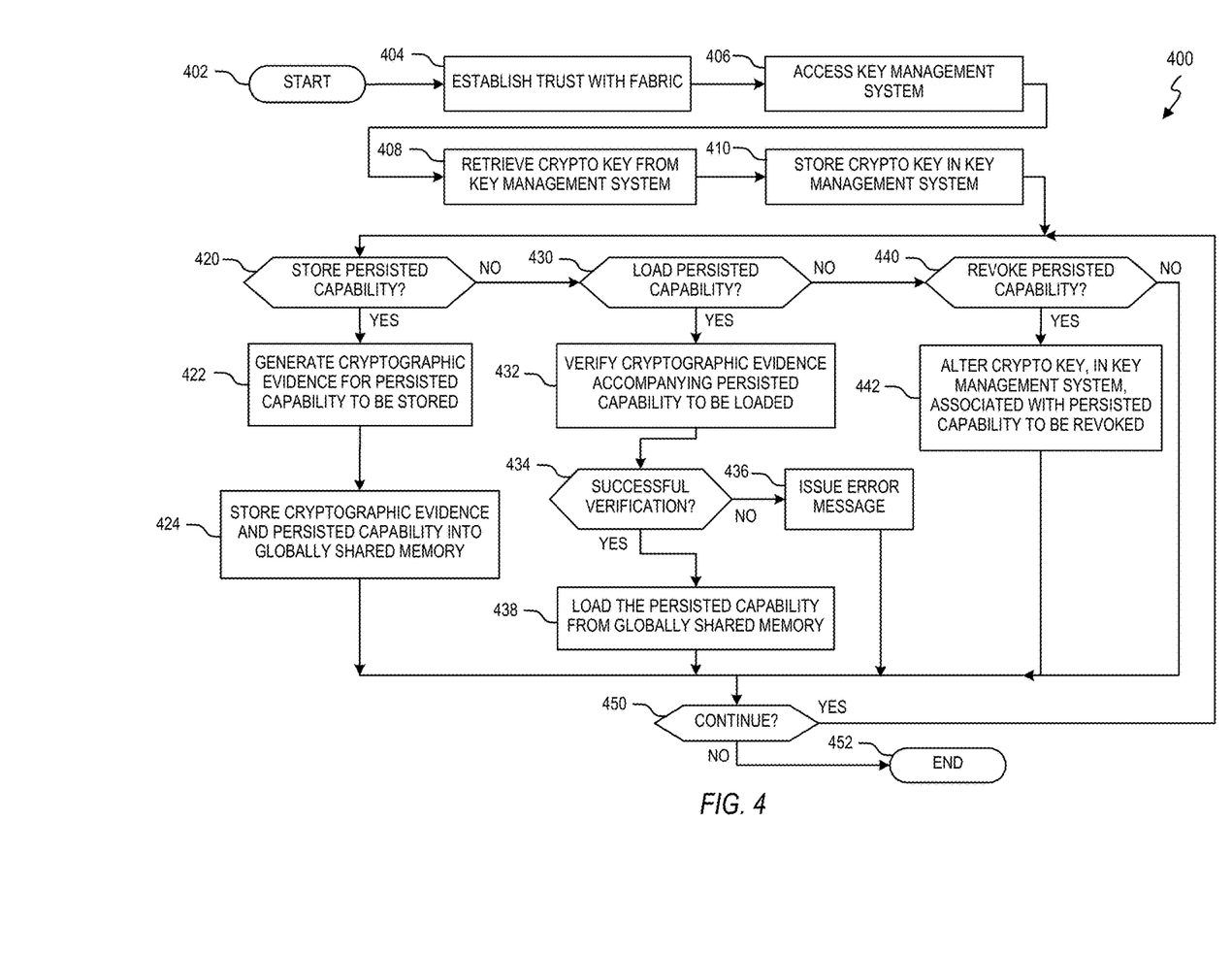
FIG. 4 is a flow diagram depicting another example method for establishing trust in persisted capabilities.

FIG. 4 is a flow diagram depicting an example method 400 for establishing trust in persisted capabilities. As with method 300, method 400 may be implemented in the form of executable instructions stored on a machine readable medium and/or executed by a processing resource and/or in the form of electronic circuitry. Method 400 may be described below as being performed by a system such as the system 200, although at least some portions of method 400 may be performed by other devices described herein. In some implementations, one or more blocks of method 400 may be executed substantially concurrently or in a different order than shown in FIG. 4, method 400 may include more or fewer blocks than are shown in FIG. 4, and one or more of the blocks of method 400 may be ongoing and/or may repeat.

Method 400 may begin at block 402 and continue to block 404, where the system establishes trusted communication with a fabric by which the system can communicate with a globally shared memory. For example, trusted communication may be established based on a Trusted Platform Module, UEFI secure boot, an admission control protocol, or other technique. At block 406, the system accesses a key management system (e.g., 280) on the basis of establishment of trusted communication with the fabric.

At block 408, the system retrieves from the key management system a cryptographic key (e.g., 282-2) for verifying cryptographic evidence (e.g., second cryptographic evidence 248). The retrieved key may have been stored to the key management system by another system or node on the fabric, may have been pre-loaded into the key management system, or may have been generated by the key management system. At block 310, the system may store at the key management system another cryptographic key (e.g., 282-1) for verification of the cryptographic evidence that the system itself may generate (e.g., first cryptographic evidence 244).

In some implementations, the system may support various instructions related to persisting capabilities, including instructions to store a persisted capability, to load a persisted capability, or to revoke access to a persisted capability. Method 400 proceeds to block 422 if instructions to store a persisted capability are invoked ("YES" at block 420), otherwise method 400 proceeds to block 430 ("NO" at block 420). If instructions to load a persisted capability are invoked ("YES" at block 430), method 400 proceeds to block 432. Otherwise ("NO" at block 430), method 400 proceeds to block 440. If instructions to revoke access to a persisted capability are invoked ("YES" at block 440), method 400 proceeds to block 442 or otherwise ("NO" at block 440) proceeds to block 450. Each of the instruction paths will now be described in turn.

To store a persisted capability, at block 422, the system generates cryptographic evidence (e.g., first cryptographic evidence 244) of authenticity and integrity of a persisted capability (e.g., first persisted capability 242) or alternatively, of a local capability (e.g., 230) that becomes the persisted capability. At block 424, the system may store the cryptographic evidence generated at block 422 and the persisted capability into globally shared memory.

More particularly, block 422 may generate the cryptographic evidence using a key related to the cryptographic key stored into the key management system at block 410, such that another system can retrieve that stored key and verify the cryptographic evidence stored at block 424. In some implementations, block 422 includes cryptographically signing the persisted capability (or a portion thereof or metadata that identifies, for example, a state of the system) using a private key of an asymmetric public-private key pair to generate a digital signature as cryptographic evidence. In this implementation, the key stored at block 410 may be the public key of that same key pair. In another implementation, the system may perform block 422 by generating an HMAC using an HMAC key and the persisted capability (or a portion or metadata thereof), and the HMAC key may be the key stored at block 410. After block 424, method 400 may continue to block 450.

Returning to block 430, the system may invoke instructions to load a persisted capability from the globally shared memory, and at block 432, the system may verify cryptographic evidence accompanying the persisted capability to be loaded. For example, the system may utilize the cryptographic key retrieved at block 408 to verify the cryptographic evidence (e.g., second cryptographic evidence 248) of another node in a manner appropriate for the type of cryptographic evidence implemented (e.g., asymmetric authentication or HMAC verification).

In particular, in some implementations, the cryptographic evidence may include a digital signature generated by a private key signing metadata that identifies a state of the node generating the cryptographic evidence, and the retrieved cryptographic key for verifying the cryptographic evidence is a public key that pairs with the private key.

In another implementation, the retrieved cryptographic key is for verifying the cryptographic evidence by generating a keyed-hash message authentication code (HMAC) based on the persisted capability to be loaded and the cryptographic key together, and a successful verification results if the HMAC matches the cryptographic evidence.

In some implementations, additional conditions are to be met before triggering a successful verification at block 434 below. For example, the cryptographic evidence may provide state information about the node that stored the persisted capability, and the system may determine whether to trust that system based on the state information. Additionally or alternatively, a timestamp may be encoded in the cryptographic evidence or may accompany the cryptographic evidence in a plaintext form or as metadata. The timestamp may indicate when the persistent capability was created. Verifying the cryptographic evidence may include confirming whether the timestamp is within a predetermined time window, otherwise the persisted capability to be loaded may be deemed expired and inaccessible (verification failed). For example, if the timestamp is encoded in an HMAC, a verifying HMAC may be calculated for each time value within the predetermined window, and each of those HMACs can be compared to the cryptographic evidence HMAC to find a match.

If the verification at block 432 is not successful ("NO" at block 434), the system may issue an error message to the process requesting access to the persisted capability. If the verification at block 432 is successful ("YES" at block 434), the system loads the persisted capability from the globally shared memory at block 438. After either block 436 or 438, the method may proceed to block 450.

Returning to block 440, the system may invoke instructions to revoke access to a persisted capability. In some implementations, a system may be restricted to revoking access to solely those persisted capabilities the system itself stored in the globally shared memory. At block 442, the system may revoke access to a persisted capability (e.g., first persisted capability 242 by altering the cryptographic key (e.g., 282-1) stored in the key management server that would otherwise be useful for verifying that persisted capability (e.g., 242). After block 442, method 400 may proceed to block 450.

At block 450, the system determines whether to continue. If the system is to continue ("YES" at block 450), method 400 returns to block 420. If the system is not to continue ("NO" at block 450), method 400 proceeds to end at block 452.

Figure 5:
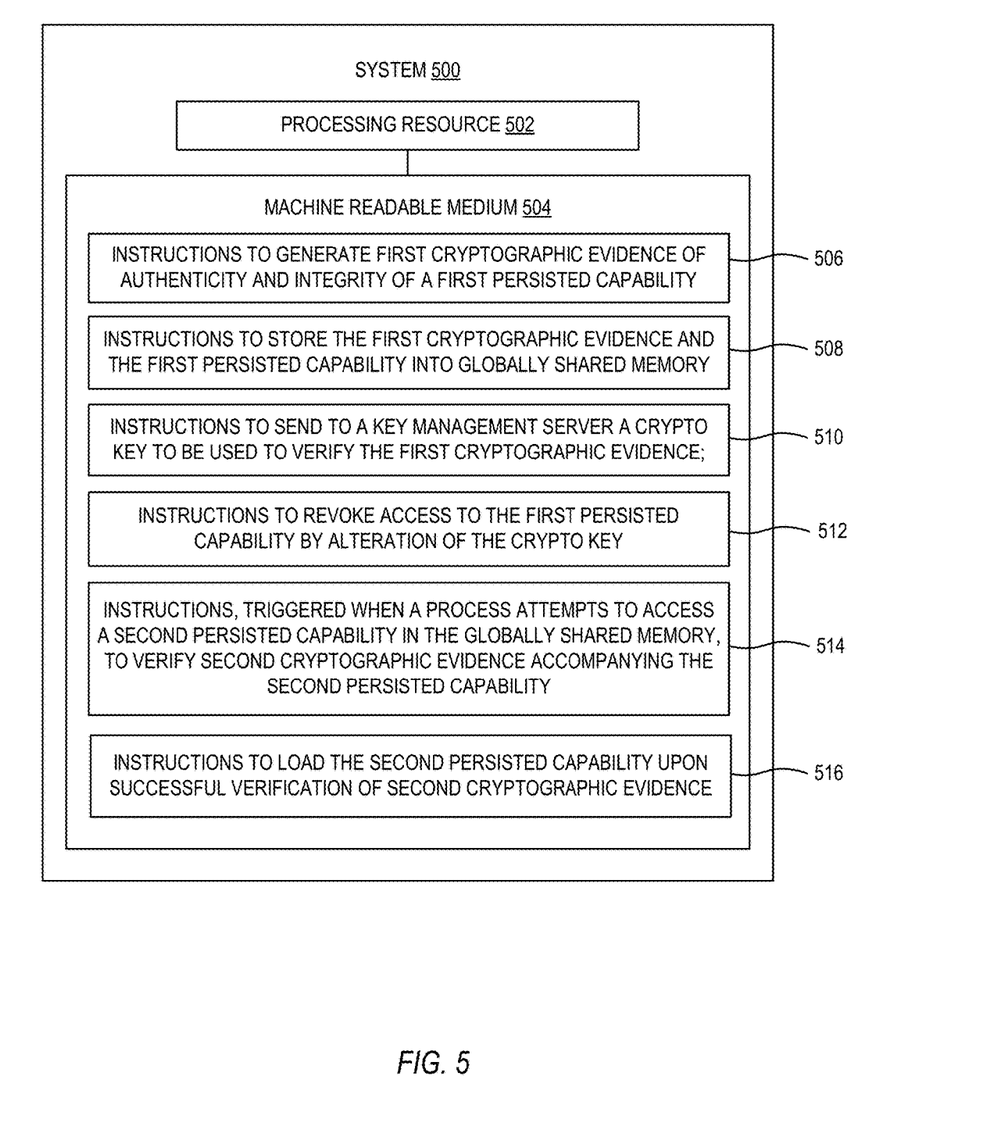
FIG. 5 is a block diagram of an example system that includes a non-transitory, machine readable medium encoded with example instructions to load a persisted capability upon successful verification of cryptographic evidence.

FIG. 5 is a block diagram of an example system 500 that includes a processing resource 502 coupled to a non-transitory, machine readable medium 504 encoded with example instructions. The processing resource 502 may include a microcontroller, a microprocessor, central processing unit core(s), an ASIC, an FPGA, and/or other hardware device suitable for retrieval and/or execution of instructions from the machine readable medium 504 to perform functions related to various examples. Additionally or alternatively, the processing resource 502 may include electronic circuitry for performing the functionality of the instructions described herein.

The machine readable medium 504 may be any medium suitable for storing executable instructions, such as RAM, ROM, EEPROM, flash memory, a hard disk drive, an optical disc, or the like. In some example implementations, the machine readable medium 504 may be a tangible, non-transitory medium, where the term "non-transitory" does not encompass transitory propagating signals. The machine readable medium 504 may be disposed within the system 500, as shown in FIG. 5, in which case the executable instructions may be deemed "installed" or "embedded" on the system 500. Alternatively, the machine readable medium 504 may be a portable (e.g., external) storage medium, and may be part of an "installation package." The instructions stored on the machine readable medium 504 may be part of an instruction set architecture employed by the system 500.

The system 500 may communicate with a globally shared memory by way of a fabric, such as a memory fabric. In some implementations, the globally shared memory may also be accessed via the fabric by other systems or nodes.

As described further herein below, the machine readable medium 504 may be encoded with a set of executable instructions 506, 508, 510, 512, 514, 516. It should be understood that part or all of the executable instructions and/or electronic circuits included within one box may, in alternate implementations, be included in a different box shown in the figures or in a different box not shown. Some implementations of the system 500 may include more or fewer instructions than are shown in FIG. 5.

Instructions 506, when executed, may cause the processing resource 502 to generate first cryptographic evidence of authenticity and integrity of a first persisted capability. The first persisted capability may be a local capability of the system 500 (or a derivative or copy of the local capability) that is to be stored and persisted in the globally shared memory.

In some implementations, instructions 506 may include instructions to generate an HMAC based on the first persisted capability and a cryptographic key. The HMAC may serve as the first cryptographic evidence of authenticity and integrity of a first persisted capability.

In other implementations, instructions 506 may include instructions to cryptographically sign the first persisted capability using a private key of an asymmetric key pair to generate a digital signature. The digital signature may serve as the first cryptographic evidence of authenticity and integrity of a first persisted capability.

Instructions 508, when executed, may cause the processing resource 502 to store the first cryptographic evidence generated by instructions 506 and the first persisted capability into the globally shared memory connected to the system via a fabric.

Instructions 510, when executed, may cause the processing resource 502 to send to a key management server a cryptographic key to be used to verify the first cryptographic evidence. For example, other nodes or systems on the fabric may retrieve the cryptographic key to verify the first cryptographic evidence stored by instructions 508. The cryptographic key may be either the same or different as the key used at instructions 506 to generate first cryptographic evidence. For example, the key described at instructions 506 and 510 may be the same if a symmetric HMAC technique is utilized to generate the first cryptographic evidence. In other examples, the key described at instructions 506 and 510 may be different—if a private key is used at instructions 506 to sign the first cryptographic evidence, the key sent by instructions 510 may include the corresponding public key of the asymmetric key pair.

Instructions 512, when executed, may cause the processing resource 502 to revoke access to the first persisted capability by alteration of the cryptographic key at the key management server (i.e., the key sent by instructions 510).

Instructions 514 may be triggered when a process executing on the system 500 attempts to access a second persisted capability in the globally shared memory. Instructions 514, when executed, may cause the processing resource 502 to verify second cryptographic evidence accompanying the second persisted capability to be accessed. Instructions 516, when executed, may cause the processing resource 502 to load the second persisted capability upon successful verification of the second cryptographic evidence by instructions 514.

Figure 6:
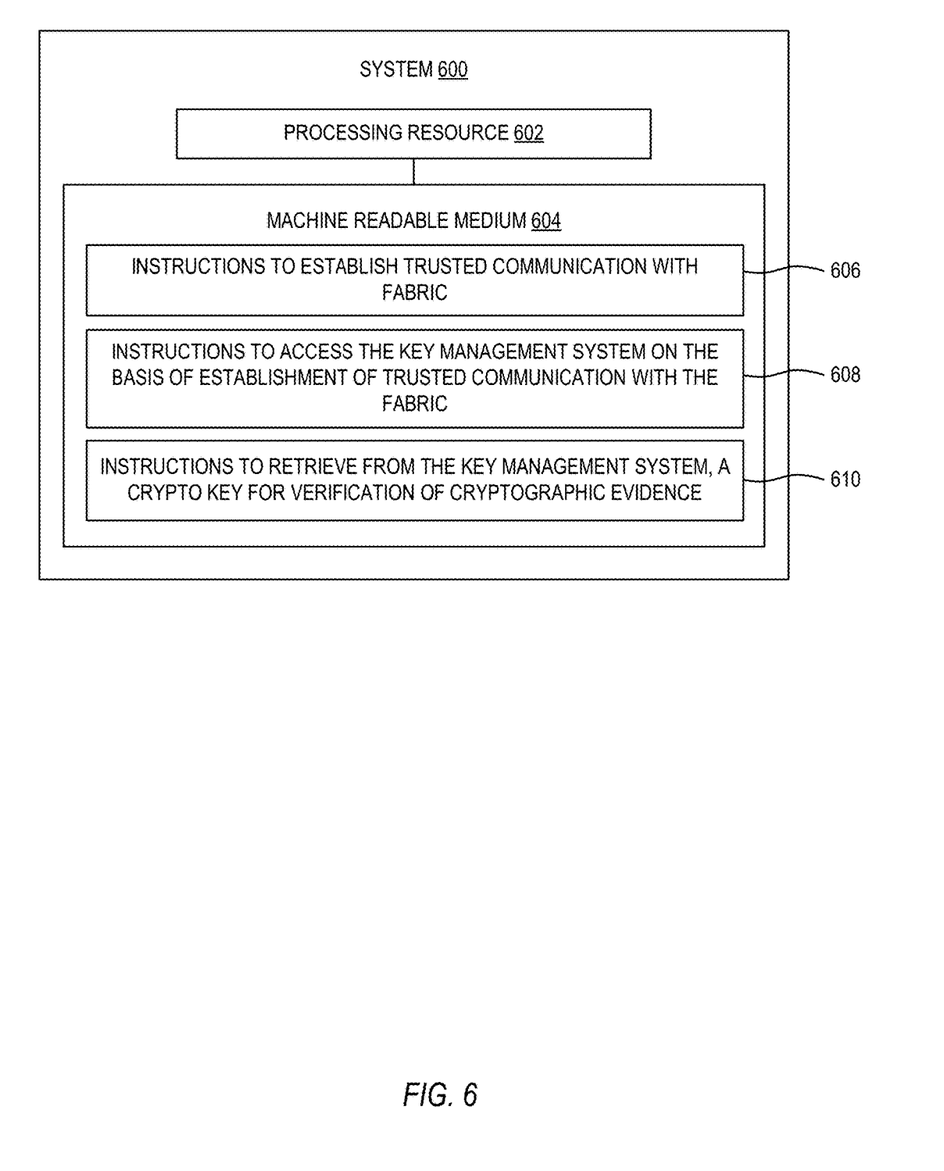
FIG. 6 is a block diagram of an example system that includes a non-transitory, machine readable medium encoded with example instructions to retrieve from the key management system a cryptographic key for verification of cryptographic evidence.

FIG. 6 is a block diagram of an example system 600 that includes a processing resource 602 coupled to a non-transitory, machine readable medium 604 encoded with example instructions. The processing resource 602 and the machine readable medium 604 may be analogous in many respects to the processing resource 502 and the machine readable medium 504, respectively. As with the system 500, the system 600 may communicate with a globally shared memory by way of a fabric, such as a memory fabric. In some implementations, the globally shared memory may also be accessed via the fabric by other systems or nodes.

The machine readable medium 604 may be encoded with a set of executable instructions 606, 608, 610. It should be understood that part or all of the executable instructions and/or electronic circuits included within one box may, in alternate implementations, be included in a different box shown in the figures or in a different box not shown. Some implementations of the system 600 may include more or fewer instructions than are shown in FIG. 6. In some examples, the instructions of the system 600 may be incorporated into the system 500.

Instructions 606, when executed, may cause the processing resource 602 to establish trusted communication with the fabric. Instructions 608, when executed, may cause the processing resource 602 to access the key management system on the basis of establishment of trusted communication with the fabric. Instructions 610, when executed, may cause the processing resource 602 to retrieve from the key management system, another cryptographic key for verification of cryptographic evidence, and more particularly, cryptographic evidence stored to the globally shared memory by a system or node other than the system 600 (e.g., verification of the second cryptographic evidence by instructions 514 described above).

In view of the foregoing description, it can be appreciated that a trust domain of a capability of a system may be extended when that capability is stored into persistent or globally shared memory, by virtue of generating cryptographic evidence of authenticity and integrity of the capability. By verifying cryptographic evidence when attempting to load, retrieve, or otherwise access persisted capabilities from the globally shared memory, a system can trust that the capability has not been forged or tampered with. Moreover, extending the trust domain in the foregoing manner may be compatible with existing architectural support for capabilities. Furthermore, a persisted capability revocation mechanism is enabled by virtue of altering or destroying the key for verifying the cryptographic evidence of the capability to be revoked.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A system comprising:
   a processing resource connected to a globally shared memory and additional processing resources via a fabric; and
   a non-transitory machine readable medium storing instructions that, when executed, cause the processing resource to:
   in response to a request from one or more processes executing on the processing resource and invoking a persisted capability stored in the globally shared memory, determine whether to trust the persisted capability by verification of cryptographic evidence accompanying the persisted capability, wherein the persisted capability stored in the globally shared memory is a second persisted capability;
   store a local capability into the globally shared memory as a first persisted capability;
   extend a trust domain of the local capability to the first persisted capability via cryptographic evidence of authenticity and integrity of the first persisted capability; and
   load the persisted capability upon the determination to trust the persisted capability based on successful verification,
   wherein the persisted capability is a token of authority employed by the system to provide the one or more requesting processes assess to system resources.

2. The system of claim 1, wherein to extend the trust domain, the processing resource is caused by the instructions to:
   cryptographically sign the local capability using a private key of an asymmetric key pair to generate a digital signature, and
   store the digital signature into the globally shared memory, the digital signature to serve as the cryptographic evidence of authenticity and integrity of the first persisted capability.

3. The system of claim 1, wherein to extend the trust domain, the processing resource is caused by the instructions to:
   generate a keyed-hash message authentication code (HMAC) based on the local capability, and
   store the HMAC into the globally shared memory, the HMAC to serve as the cryptographic evidence of authenticity and integrity of the first persisted capability.

4. The system of claim 1, wherein the non-transitory machine readable medium stores instructions that, when executed, cause the processing resource to:
   establish trusted communication with the fabric that includes the globally shared memory, and
   upon establishment of the trusted communication:
   provide a public key of an asymmetric key pair to a key management system, and retrieve another public key from the key management system, the another public key provided to the key management system by a node in communication with the globally shared memory, and the another public key for verification of cryptographic evidence accompanying a third persisted capability stored to the globally shared memory by the node.

5. The system of claim 1, wherein the non-transitory machine readable medium stores instructions that, when executed, cause the processing resource to:
establish trusted communication with the fabric that includes the globally shared memory, and
upon establishment of the trusted communication:
provide to a key management system a key for calculation of keyed-hash message authentication codes (HMACs),
retrieve another key from the key management system, the another key provided to the key management system by a node in communication with the globally shared memory, and the another key for generating an HMAC of a third persisted capability stored by the node to the globally shared memory, the generated HMAC for comparison-based verification of cryptographic evidence accompanying the third persisted capability of the node by the node.

6. The system of claim 1, wherein the cryptographic evidence accompanying the first persisted capability includes a digital signature or keyed-hash message authentication code based on metadata, the metadata including state information of a node that created the persisted capability.

7. The system of claim 1, wherein the non-transitory machine readable medium stores instructions that, when executed, cause the processing resource to revoke access to the first persisted capability by replacement of a key that verifies the first persisted capability with a different key or no key.

8. The system of claim 1, wherein the second persisted capability is the first persisted capability, and
the request to access the second persisted capability is issued by a process executing on the processing resource after a reboot of the processing resource.

9. The system of claim 1, wherein the fabric comprises a memory fabric connecting the processing resource of the system to the additional processing resources within a rack-scale system such that the system and the additional processing resources share access to the globally shared memory within the rack-scale system.

10. A method for establishing trust in persisted capabilities by a system including physical processing resource implementing machine readable instructions, the method comprising:
generating first cryptographic evidence of authenticity and integrity of a first persisted capability;
storing the first cryptographic evidence and the first persisted capability into globally shared memory connected to the system via a fabric;
when a process executing on the physical processing resource of the system invokes a second persisted capability stored in the globally shared memory by an additional physical processing resource connected to the system and the globally shared memory via the fabric:
establishing trusted communication with the fabric;
accessing a key management system on the basis of establishment of trusted communication with the fabric; and retrieving from the key management system a cryptographic key for verifying a second cryptographic evidence;
verifying the second cryptographic evidence accompanying the second persisted capability using the retrieved cryptographic key; and
loading the second persisted capability upon successful verification of the second cryptographic evidence,
wherein the first persisted capability and the second capability are tokens of authority employed by the same to provide processes access to system resources.

11. The method of claim 10, further comprising storing at the key management system another cryptographic key for verification of the first cryptographic evidence.

12. The method of claim 10, wherein the retrieved cryptographic key is for verifying the second cryptographic evidence by generating a keyed-hash message authentication code (HMAC) based on the second persisted capability and the cryptographic key together, and causing a successful verification if the HMAC matches the second cryptographic evidence.

13. The method of claim 10, wherein the second cryptographic evidence includes a digital signature generated using a private key on metadata that identifies a state of the system, and
the retrieved cryptographic key for verifying the second cryptographic evidence is a public key that pairs with the private key.

14. The method of claim 10, further comprising:
storing in a key management server a second cryptographic key for verifying the first cryptographic evidence; and
revoking access to the first persisted capability by altering the cryptographic key stored in the key management server.

15. The method of claim 10, wherein the second cryptographic evidence is associated with a timestamp indicating when the second persistent capability was created, and the verifying the second cryptographic evidence includes confirming whether the timestamp is within a predetermined time window.

16. The method of claim 10, wherein the second persisted capability is the first persisted capability, and
the verifying a second cryptographic evidence is enforced after a reboot of the system.

17. A non-transitory machine readable medium storing instructions executable by a processing resource of a system, the non-transitory machine readable medium comprising:
instructions to generate first cryptographic evidence of authenticity and integrity of a first persisted capability;
instructions to store the first cryptographic evidence and the first persisted capability into globally shared memory connected to the system via a fabric;
instructions, triggered when one or more processes executing on the processing resource of the system invokes the first persisted capability stored in the globally shared memory, to send to a key management server a cryptographic key to be used to verify the first cryptographic evidence;
instructions to revoke access to the first persisted capability by alteration of the cryptographic key at the key management server;
instructions, triggered when the one or more processes executing on the processing resource of the system invokes a second persisted capability stored in the globally shared memory by an additional processing resource connected to the system and the globally shared memory via the fabric, to:

establish trusted communication with the fabric;

access the key management system on the basis of establishment of trusted communication with the fabric;

retrieve from the key management system, another cryptographic key for verification of the second cryptographic evidence;

verify second cryptographic evidence accompanying the second persisted capability using the another cryptographic key; and instructions to load the second persisted capability upon successful verification of the second cryptographic evidence, wherein the first persisted capability and the second persisted capability are tokens of authority employed by the system to provide processes access to system resources.

18. The non-transitory machine readable medium of claim 17, wherein the instructions to generate first cryptographic evidence includes:

instructions to generate a keyed-hash message authentication code (HMAC) based on the first persisted capability and the cryptographic key, the HMAC to serve as the first cryptographic evidence of authenticity and integrity of a first persisted capability, or instructions to cryptographically sign the first persisted capability using a private key of an asymmetric key pair to generate a digital signature, the digital signature to serve as the first cryptographic evidence of authenticity and integrity of a first persisted capability, and the cryptographic key includes a public key of the asymmetric key pair.

* * * * *